United States Patent [19]

Kautz et al.

[11] Patent Number: 4,476,415

[45] Date of Patent: Oct. 9, 1984

[54] FEEDBACK TRANSDUCER

[75] Inventors: Thomas O. Kautz, Waukesha; Gerald A. Duenkel, Milwaukee, both of Wis.

[73] Assignee: Johnson Service Company, Milwaukee, Wis.

[21] Appl. No.: 447,168

[22] Filed: Dec. 6, 1982

Related U.S. Application Data

[62] Division of Ser. No. 410,085, Aug. 20, 1982.

[51] Int. Cl.³ .............................................. H02K 41/00
[52] U.S. Cl. ..................................... 318/135; 318/662; 318/663; 318/636; 318/628; 318/687; 338/130; 338/131; 338/153
[58] Field of Search ............... 318/135, 628, 636, 640, 318/647, 648, 650, 651, 652, 653, 662, 663, 687; 33/127, 129, 132 R, 141 F, 143 L, 147 N, 149 J, 172 E, 1 PT; 338/117, 118, 174, 183, 153, 202

[56] References Cited

U.S. PATENT DOCUMENTS

| | | | |
|---|---|---|---|
| 2,899,653 | 8/1959 | Capron | 33/172 E X |
| 3,296,521 | 1/1967 | Wildberger | 318/663 X |
| 4,057,904 | 11/1977 | Urabel et al. | 338/68 X |
| 4,123,740 | 10/1978 | Palmer et al. | 338/153 X |
| 4,142,144 | 2/1979 | Rohr | 318/662 X |
| 4,333,068 | 6/1982 | Kishel | 338/202 X |

Primary Examiner—G. Z. Rubinson
Assistant Examiner—Paul Shik Luen Ip
Attorney, Agent, or Firm—John Phillip Ryan; Larry L. Shupe; Joseph J. Jochman, Jr.

[57] ABSTRACT

A transducer for generating a feedback signal representative of the position of a movable member includes a signal generating mechanism for providing an electrical feedback signal representative of the position of the movable member. The signal generating mechanism includes a first shaft portion having a first longitudinal centerline and a drive mechanism having a shaft member coupled in driving engagement to the first shaft portion. The drive mechanism is adapted to be cable connected to one of a plurality of movable members having maximum travel spans different one from the other. The shaft member has a shaft longitudinal centerline which is concentric with the first centerline, the centerlines defining a first axis. An alignment mechanism is coupled to the drive mechanism and the signal generating mechanism and permits limited movement of the first axis with respect to a reference axis. The alignment mechanism thereby isolates the signal generating mechanism from misalignment reaction forces.

10 Claims, 10 Drawing Figures

FEEDBACK TRANSDUCER

This is a division, of application Ser. No. 06/410,085, filed Aug. 20, 1982.

BACKGROUND OF THE INVENTION

The present invention relates to apparatus for actuator positioning and more particularly to an electronically controlled positioner for pneumatic actuators as used in heating, ventilating and air conditioning (HVAC) applications.

Equipment used to control the atmospheric environment within buildings frequently includes sources of heated and chilled water together with air handling units which utilize these sources to affect the temperature of air being introduced into the conditioned space within a building. Such air handling units employ positionable dampers and valves, the former for controlling the flow of air into and out of the building and for air mixing and the latter for controlling the position of valves used to regulate the flow of heated or chilled water. Actuators are frequently used for valve and damper positioning and may be of the mechanically, electrically or pneumatically driven type. However, it is convenient to employ pneumatic actuators for the purpose as such are characterized by relatively low cost and high reliability.

One approach to the control of pneumatic actuators is to provide a pair of electrically-actuated solenoid valves, one of which is coupled to a pneumatic bus installed within a building and the other of which is arranged for selective expulsion of the pneumatic fluid from the actuator. For buildings having no central pneumatic bus, a small, electrically powered air compressor may be provided for individual or small groups of coincidently-controlled actuators. Systems of either the solenoid valve type or of the locally installed air compressor type may be coupled to a programmed computer for controlled actuator positioning and an example of such a system is shown and described in U.S. Pat. No. 4,261,509.

While such arrangements for actuator positioning have heretofore been satisfactory, they tend to be characterized by certain disadvantages. In particular, such systems frequently utilize relatively large and expensive electromagnetic switches. Such switches require undesirably high power levels and are often the source of electrical switching spikes or transients which may adversely affect computer circuitry. Another disadvantage is that such systems are configured only for the separate, relatively expensive mounting of several discrete components which are relatively difficult to adapt to pre-existing actuators used on an HVAC system. Additionally, such apparatus makes no provision for the isolation of switching transients for computerized controller protection nor does it make provisions for the generation of feedback signals indicative of actuator position. Further, it is frequently desirable to employ an electronically controlled positioner which may be adapted for use with low voltage, low power command signals. Such signals may be generated by a computerized controller programmed for the solution of proportional, proportional integral, and/or proportional integral derivative algorithms to provide incremental or proportional control signals. The use of incremental control permits an actuator to be commanded to stroke through a computed percentage of its total available travel span while proportional control permits an actuator to be commanded to stroke to a prescribed position within its span. An electronically controlled positioner for pneumatic actuators which overcomes the aforementioned disadvantages and which incorporates the aforementioned features would be a significant advance over the prior art.

SUMMARY OF THE INVENTION

In general, the present invention comprises an electronically controlled positioner for pneumatic actuators including first means for selectively flowing compressed gas to an actuator and valve means for selectively exhausting the compressed gas from the actuator. An electronic control panel is adapted to receive command signals from a computerized controller and includes means for isolating from the controller any electrical transients which may result when switching the first means and the valve means. The panel is coupled to the first means and to the valve means for actuation thereof in response to the command signals. An optional pressure switch may be provided for disabling the positioner in the event the pressure of the compressed gas reaches a predetermined high limit.

In a first preferred embodiment, the first means for selectively flowing compressed gas to the actuator includes a self-contained, oscillating gas compressor having an electromagnetically-powered armature pivotable at one end for reciprocating movement. A pair of gas pumps are disposed one at either side of the armature in opposing relationship for alternate actuation by the armature. The pump output ports are coupled in parallel and plumbed to the actuator for permitting the introduction of compressed gas thereto. A normally open, low voltage, low power electromagnetic solenoid valve has its flow passage coupled in parallel with the pump output ports and, includes an interior plunger (not shown) movable to a first position for valve closure when its solenoid coil is energized. The plunger is spring biased to a second position for opening the flow passage when the coil is de-energized to permit the exhaustion of compressed gas from the actuator to the surrounding atmospheric ambient. The compressor and the valve thereby cooperate to selectively flow compressed gas between atmospheric ambient and the actuator in response to actuating signals received from a control panel. An incremental electronic control panel preferably configured as a printed circuit board, is adapted to be coupled to and receive digital command signals from a computerized controller and is connected to the gas compressor and the solenoid valve for selectively actuating the compressor and/or the valve, thereby causing the actuator to extend, hold or retract.

A second embodiment of the inventive positioner differs only slightly from that of the first and further includes a feedback transducer, preferably of the potentiometer-type having a first potentiometer for generating feedback signals representative of actuator position. A second potentiometer may also be provided for driving a third embodiment of the positioner which may be arranged in a slave relationship to a positioner of the second embodiment.

A third embodiment of the positioner differs only slightly from that of the second embodiment and includes, in place of the incremental electronic control panel, an analog proportional control panel adapted to receive analog voltage signals from the computerized controller. The feedback transducer of either the second or third embodiment incorporates a unique alignment mechanism which permits free rotation of the potentiometer first drive shaft portion and prevents rotation of the potentiometer second housing portion while permitting limited movement of the potentiometer shaft axis with respect to a reference axis. The alignment mechanism thereby isolates the potentiometers from misalignment reaction forces or moments which may otherwise be destructive thereof and results in a significant increase in the life and the reliability of the feedback transducer.

It is an object of the invention to provide an electronically controlled positioner which may be adapted for the reception of digital or analog signals.

Another object of the present invention is to provide an electronically controlled positioner which may incorporate means for generating a position feedback signal.

Yet another object of the present invention is to provide an electronically controlled positioner which includes a self-contained means for selectively flowing compressed gas to an actuator.

Still another object of the present invention is to provide an electronically controlled positioner which may be adapted for use with computerized controllers.

Another object of the present invention is to provide an electronically controlled positioner which includes means for isolating electrical faults and switching transients. These and other objects of the invention will become more apparent from the detailed description thereof taken in conjunction with the accompanying drawing.

DESCRIPTION OF THE PREFERRED EMBODIMENTS

Figure 1:
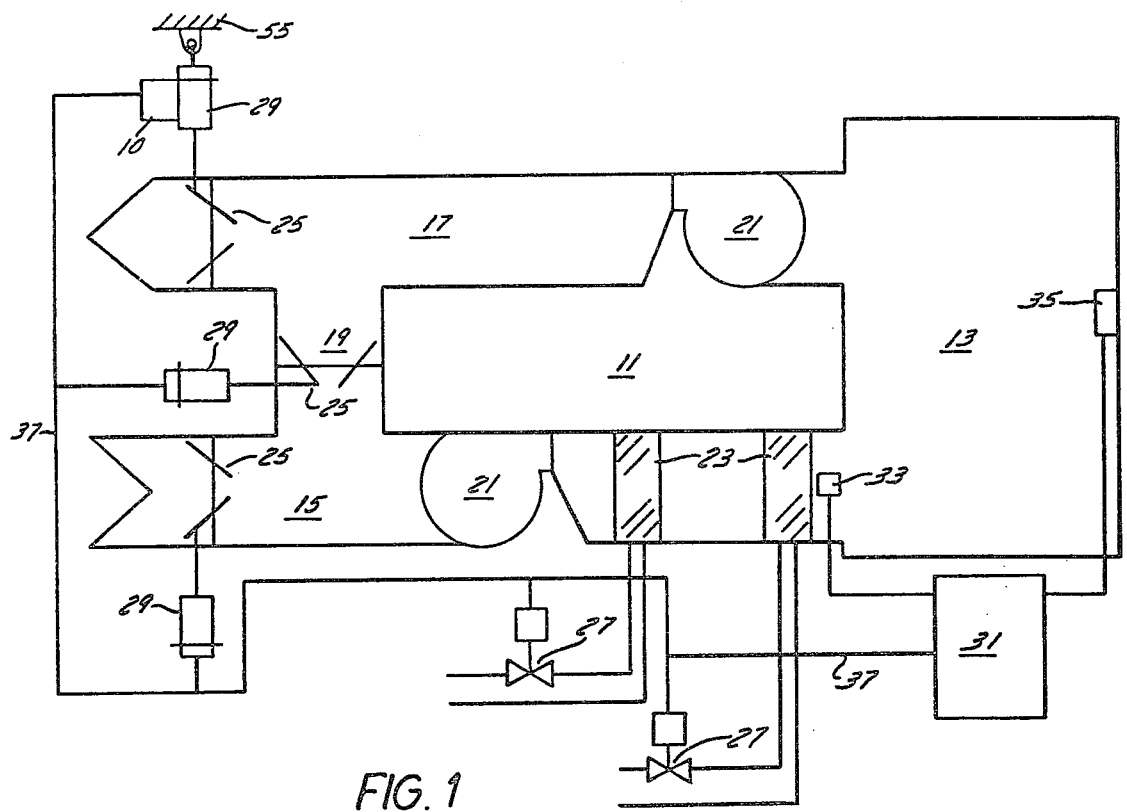
FIG. 1 is a simplified, block pictorial diagram of the electronically controlled positioner shown in conjunction with an air handling unit and a computerized controller.

Referring to FIG. 1, the electronically controlled positioner 10 is shown in conjunction with an air handling unit 11 for controlling the flow of conditioned air to a space 13 such as, for example, one or more offices. The air handling unit 11 includes a first duct 15 for directing air from the outside ambient to the space 13, a second duct 17 for exhausting air therefrom and a cross duct 19 for air mixing. Fans 21 are provided for air movement while heat exchanger coils 23 are disposed within the first duct 15 for controllably heating or cooling the air passing therethrough. The air handling unit 11 also includes a plurality o positionable dampers 25 for controlling air movement and a plurality of actuator-operated valves 27 for controlling the flow of the heated or chilled fluid through the coils 23. Each damper 25 or valve 27 has associated therewith a pneumatic actuator 29 for positioning control. Each actuator 29 may have associated therewith a positioner 10, only one of which is shown for illustrative purposes. A computerized controller 31 receives signals such as temperature signals from a first sensor 33 for indicating the temperature of air being introduced to the space and a second sensor 35 for indicating the actual temperature of the air within the space 13. The controller 31 selectively provides command signals along an electrical bus 37 coupled intermediate the controller and the positioner 10, such signals being in accordance with the solution of mathematical algorithms programmed within the controller 31.

Figure 2:
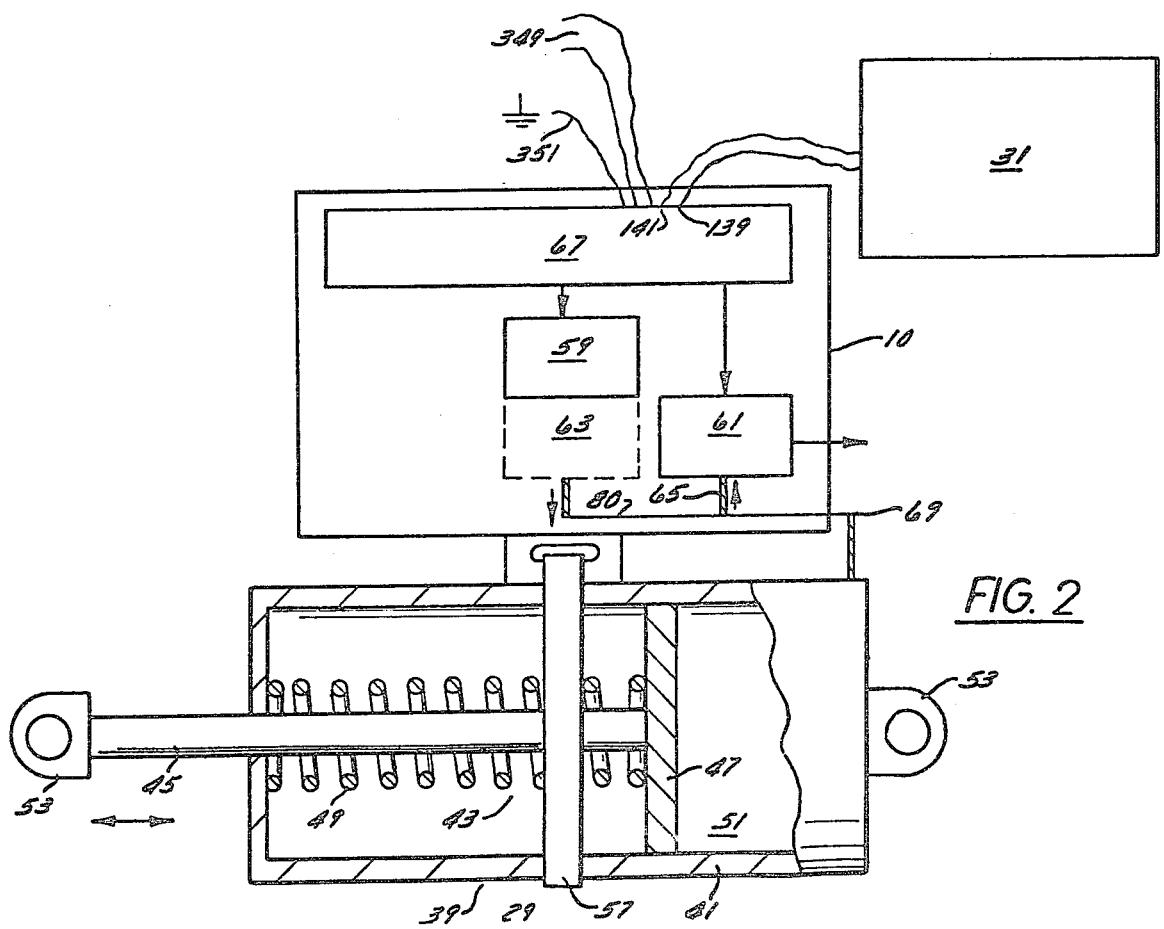
FIG. 2 is a simplified block diagram of a first embodiment of the positioner of the present invention shown with portions broken away and in conjunction with a pneumatic actuator.

Referring next to FIGS. 1 and 2, a first embodiment of the positioner 10 is shown in conjunction with a spring biased pneumatic actuator 29 which includes an elongate, hollow cylindrical body 41 having a piston assembly 43 movably disposed therein. The piston assembly 43 includes a rod member 45 having a disk-shaped head 47 concentrically attached thereto for closely fitted, slidable engagement with the interior surface of the body 41. A coiled biasing spring 49 is concentrically disposed about the rod member for biasing the piston assembly 43 in a rightwardly direction as seen in FIG. 2. Upon the introduction of compressed gas, typically air, into the actuator piston chamber 51, the biasing force of the spring 49 may be overcome and the piston assembly 43 controllably positioned along its travel span with the quiescent position thereof being dependent upon the spring constant of the spring 49 and the pressure of the gas within the chamber 51. Clevises 53 are provided at either end of the actuator 29 for coupling the actuator 29 intermediate a stationary support member 55 and the damper 25 or valve 27 to be positioned. The positioner 10 may be coupled to the actuator body 41 using a suitable clamp 57 such as worm drive pipe clamp.

The positioner 10 has a first means including a compressor 59 for selectively flowing compressed gas to the actuator 29, valve means 61 for selectively exhausting compressed gas from the actuator 29 and an optional pressure switch 63 for disabling the compressor 59 in the event the pressure within the actuator 29 reaches a predetermined high limit. The rate at which compressed gas is expelled from the chamber 51 under the urging of the biasing spring 49 may be conveniently controlled in a known manner by a fixed or adjustable restrictor (not shown), sometimes termed a pneumatic resistor, disposed in the pneumatic conductor 65 in series with the valve means 61. An incremental electronic control panel 67 may be interfaced with the computerized controller 31 for the reception of command signals therefrom and actuates the compressor 59 and the valve 61 in accordance with such signals. A pneumatic conductor 69 is coupled between the positioner 10 and the actuator 29 for permitting the introduction of compressed gas into and the expulsion of gas from the actuator 29.

Figure 3:
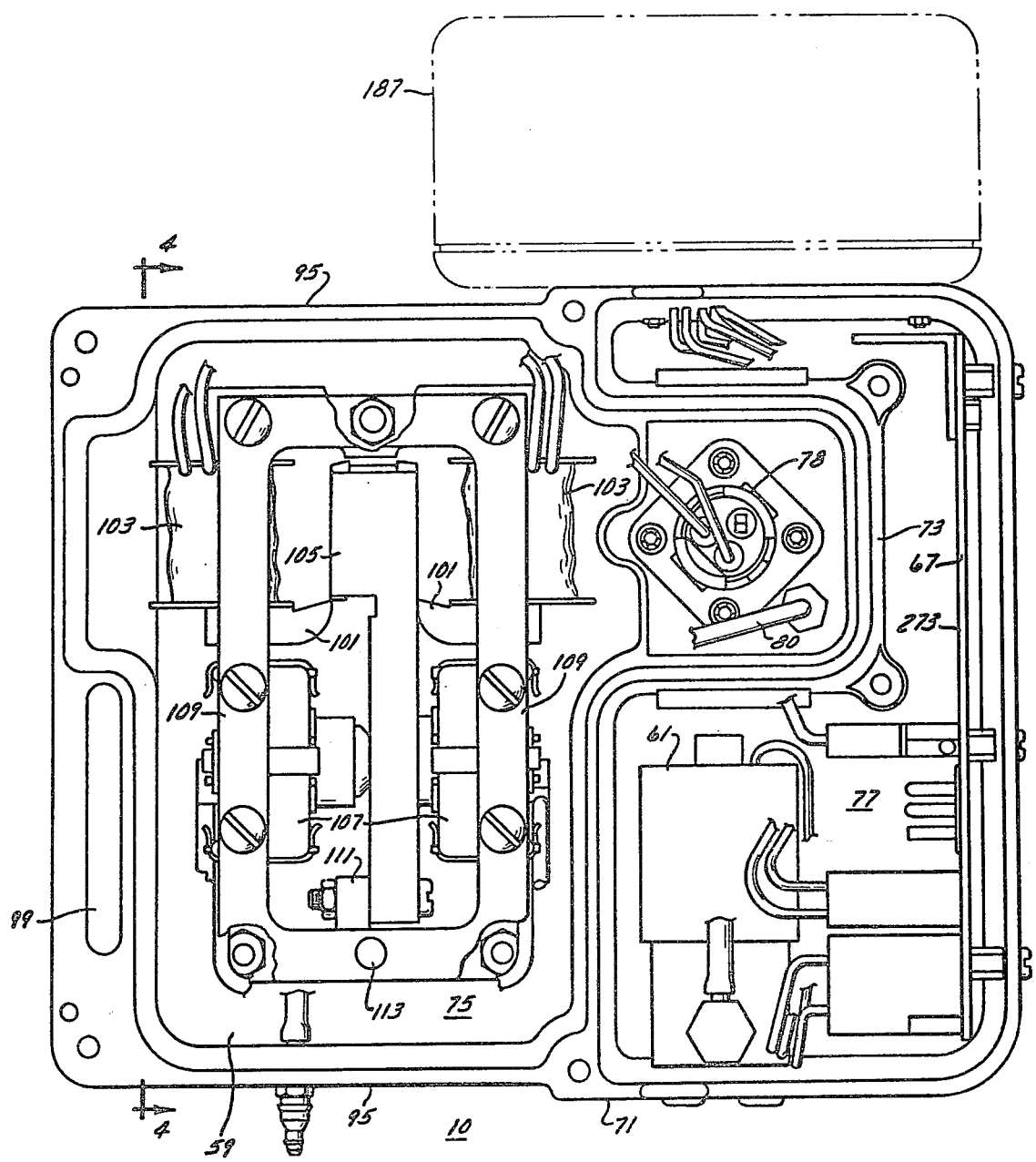
FIG. 3 is a top plan view of the positioner of the present invention.
Figure 4:
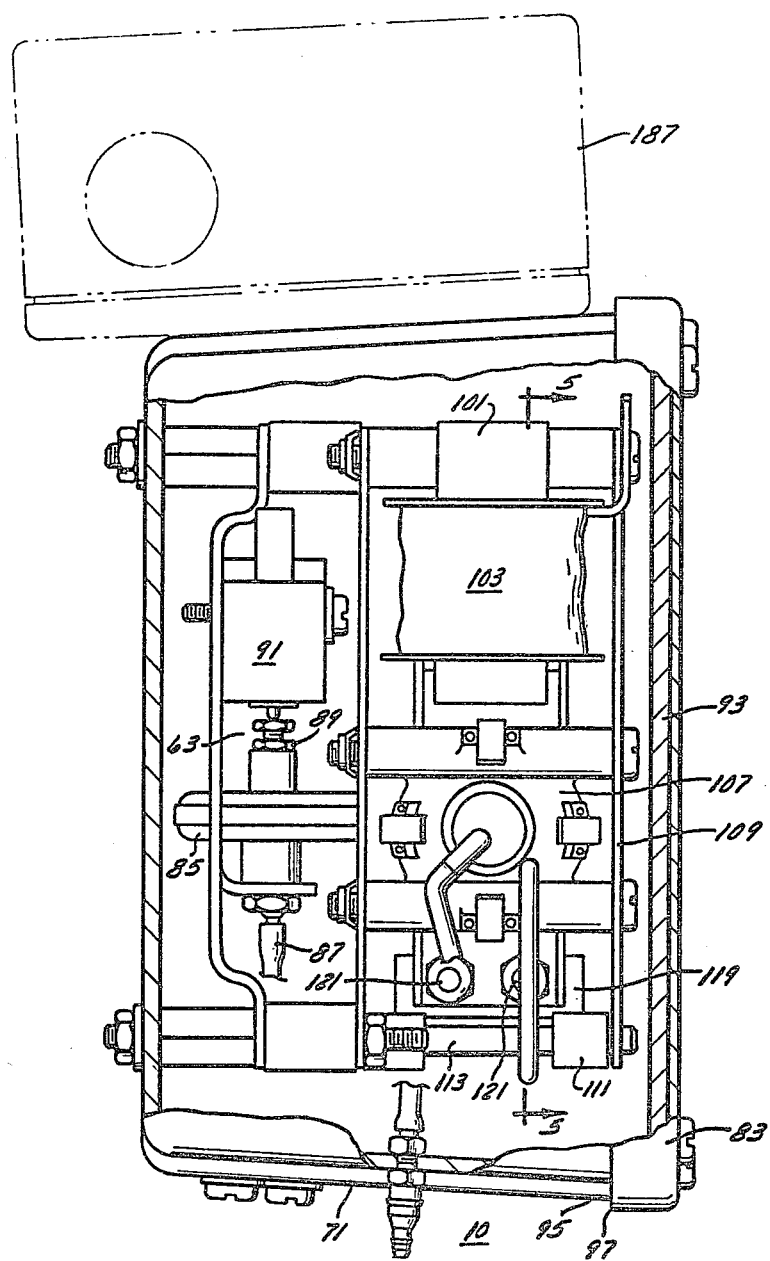
FIG. 4 is a side elevation view of the positioner shown in FIg. 3 taken along the plane 4—4 with portions broken away and including an optional pressure switch.

Referring next to FIGS. 3 and 4, the positioner 10 may be conveniently housed in a cabinet 71 preferably made as an aluminum diecasting and having a dividing wall member 73 formed therein to define a first compartment 75 and a second compartment 77. The first compartment 75 is sized to receive the compressor 59, and the optional pressure switch 63, a gas and water tight connecting plug 78 for coupling wiring between the compartments 75, 77 and a tube 80 for coupling the solenoid valve 61 to the compressor 59 and, optionally, to the switch 63. The second compartment 77 includes the electronic control panel 67 and the solenoid valve 61. The cabinet 71 and its cover 83 are provided for protecting the components from airborne contamination and physical damage. A satisfactory pressure switch 63 may be constructed using an expansible bellows 85 having its input nozzle 87 connected in a pressure sensing relationship to the conductor 69 used to couple the positioner 10 to the actuator 29. Its output end 89 is mechanically coupled to an electrical switch 91 for actuation thereof and consequent compressor disabling when the pressure reaches a predetermined upper limit. A replaceable planar air filter gasket 93 is disposed intermediate the cabinet 71 and the cover 83 for filtering the intake air which is drawn into the compressor 59 and all other leakage passages to the first compartment 75 are sealed to effect such filtering. In order to provide passageways for permitting air to be drawn through the filter 93 to the compressor 59, the cabinet 71 includes an inwardly sculpted profile 95 in spaced apart relation to the cover edge 97. Additionally, an elongate section aperture 99 is formed in the cabinet 71 for the purpose. In order to assure that all of the electronic circuitry is at common ground potential, the cabinet 71 is preferably grounded.

Figure 5:
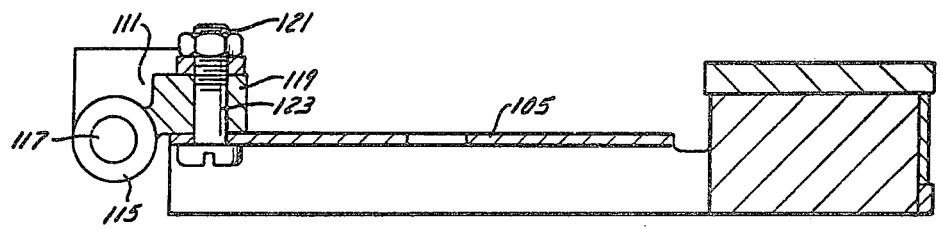
FIG. 5 is a side elevation view, partly in cross section, of the positioner air compressor armature taken along the plane 5—5 of FIG. 4.

The compressor 59 is shown to include a laminated magnet member 101, a pair of electromagnetic coils 103 for providing oscillating movement of the armature 105 and a pair of miniature air pumps 107 attached to the frame 109 and disposed one on either side of the armature 105 in opposing relationship one to the other for alternate, reciprocating actuation. Further details of the construction and arrangement of the air compressor 59 are fully shown and described in U.S. Pat. Nos. 3,784,334 and 3,936,245 which are incorporated herein by reference. However, it has been found that the mechanism used for supporting the armature 105 as disclosed therein results in an armature life expectancy which is undesirably low. Accordingly, an improved armature support assembly is shown in FIGS. 3, 4 and 5 to include a pivotable clevis 111 having a cylindrical support pin 113 disposed concentrically therethrough with slight clearance. The clevis 111 is formed of a polyacetal based thermoplastic material tailored for uniform oil lubrication and is commercially available from TFE Industries of Kalamazoo, Mich., under the trademark Oilon Pv80. The clevis 111 includes a pair of eye members 115 each having a circular, concentric aperture 117 therethrough for pivotably engaging the pin 113 and a boss member 119 rigidly joined between the eye members 115 for fastening the armature 105 to the clevis 111. Fastening may be by a pair of bolts 121 disposed in suitable openings 123 through the boss member 119 and arranged in clamping engagement with the armature 105.

Figure 6:
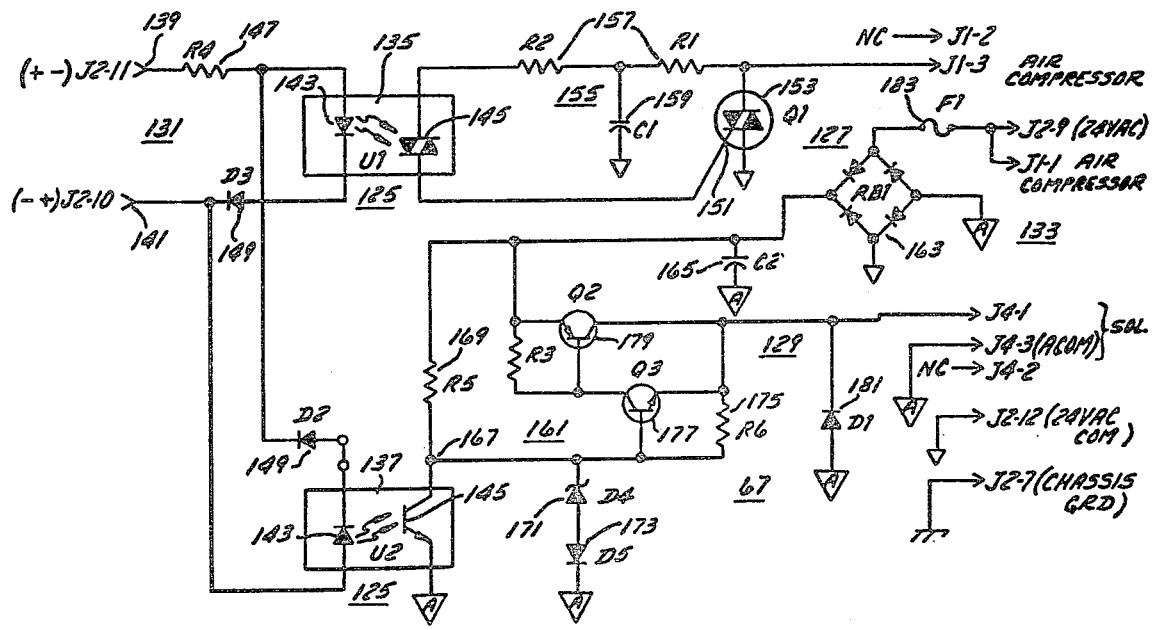
FIG. 6 is a schematic circuit diagram of the positioner incremental electronic control panel.

Referring next to FIGS. 2 and 6, an incremental electronic control panel 67 is provided for receiving and utilizing command signals emanating from the controller 31. The panel 67 includes coupling means 125 for isolating from the controller 31 any electrical transients which may result when switching the compressor 59 and the valve 61 and opto couplers are preferred for the purpose. The control panel 67 further includes a first circuit 127 for driving the compressor 59 and a second circuit 129 for driving the solenoid valve 61. An input section 131 receives DC signals from the controller 31 while an output section 133 selectively actuates the compressor 59 and the valve 61 in accordance with those signals.

More particularly and as best seen in FIG. 6, the coupling means 125 include opto couplers comprising an opto triac 135 and an opto transistor 137 to receive input signals from the controller 31 at the first input terminal 139 and the second input terminal 141. A preferred coupling means 125 includes an LED 143 for generating light in response to an electrical current flowing therethrough and a light sensing means 145 for detecting the light and generating an electrical switching signal in response thereto. The coupling means 125 are connected such that their light emitting diodes 143 are in an electrically parallel, oppositely conducting relationship. A resistor 147 is provided for limiting the control signal current while diodes 149 protect each LED 143 from reverse voltage. The LED 143 of the opto triac 135 is connected so that a DC control signal, preferably 12 VDC, applied with its high voltage side at the first input terminal 139 will switch the triac 135 to a conducting state while the LED 143 of the transistor 137 is connected so that a DC control signal applied with its high voltage side at the second input terminal 141 will switch it to a conducting state. When the triac 135 is commanded to conduct, its output signal is applied to the gate terminal 151 of a second triac 153, thereby permitting 24 VAC to be applied to the air compressor coils 103. A snubber network 155 is defined by the resistors 157 and a capacitor 159 for reducing the rate of voltage rise as applied to the gate terminal 151 of the second triac 153 which would otherwise result when switching the inductive load represented by the air compressor coils 103.

The transistor 137 of the second circuit 129 is provided for controlling the regulating circuit 161 that selectively applies a 12 VDC output to the solenoid valve 61 while the bridge rectifier 163 and the capacitor 165 provide a filtered, full wave rectified DC input to the regulating circuit 161. When the transistor 137 is switched to a conducting state, it effectively grounds a point 167 common to both the resistor 169 and the zener diode 171, thereby preventing the application of an actuating voltage to the coil of the solenoid valve 61. When the transistor 137 is in the nonconducting state, the diode 171 regulates the voltage applied to the coil of the solenoid valve 61, such voltage being equal to the regulated voltage of the diode 171 plus the voltage drop across the diode 173 minus the voltage drop across the resistor 175. The voltage drop across this latter resistor 175 functions to switch a transistor 177 to a conducting state, such switching thereby sequentially switching transistor 179 to a conducting state for providing a current path to the coil of the solenoid valve 61 through transistor 179. This arrangement is advantageous in that the power dissipating requirements of diode 171 and resistor 169 are thereby reduced while yet providing zener regulation of the output voltage. A diode 181 is provided to protect the second circuit 129 from the reverse voltage transient spike resulting from the de-energization of the coil of the solenoid valve 61. A fuse 183 is provided for limiting the supply current to two amperes maximum.

Figure 7:
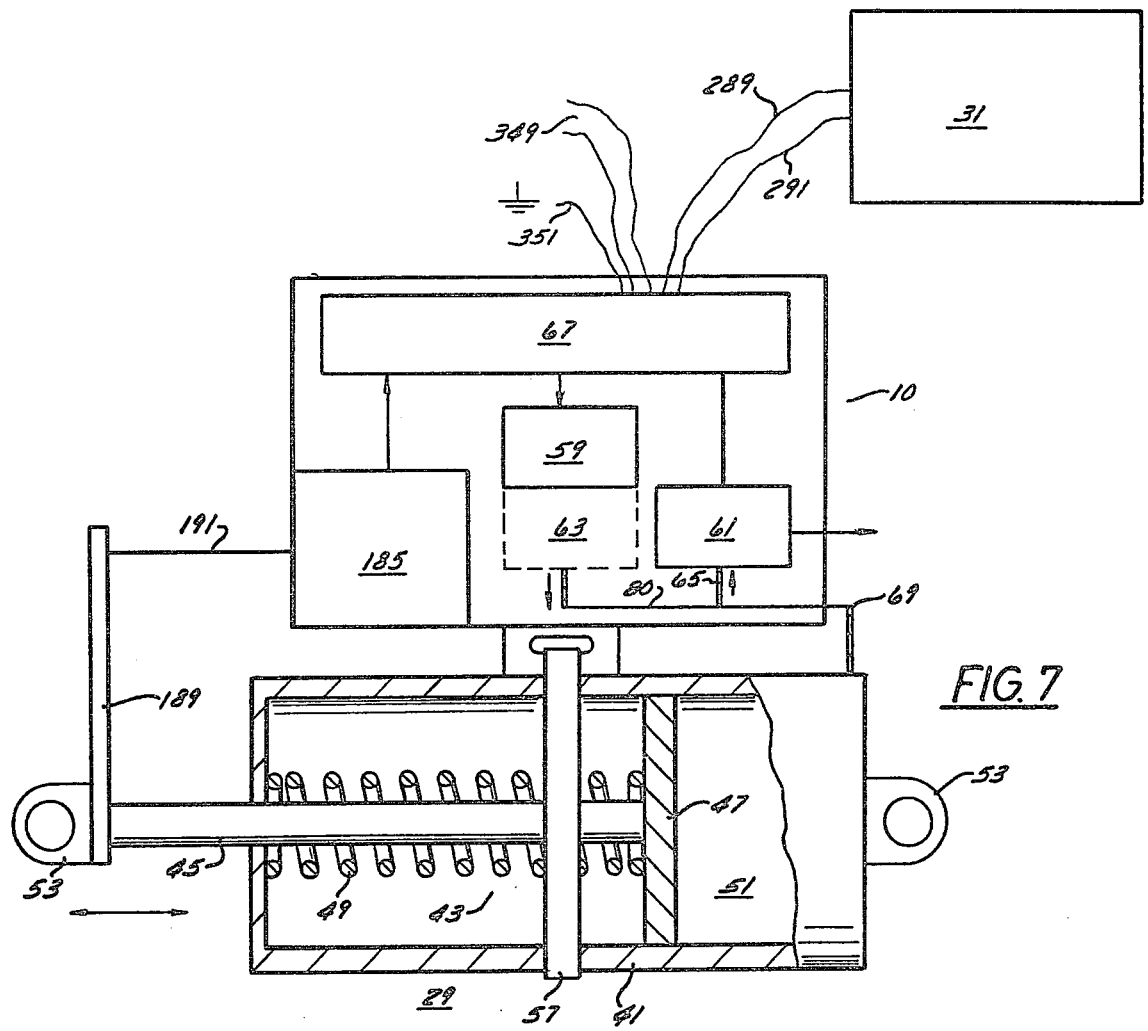
FIG. 7 is a simplified block diagram of a second embodiment of the positioner of the present invention shown with portions broken away and in conjunction with a pneumatic actuator.

Referring next to FIGS. 3, 4 and 7, a second embodiment of the positioner 10 is shown and differs only slightly from that of the first embodiment in that it additionally includes a feedback transducer 185 which coacts with the actuator 29 for generating signals representative of the actual position of the piston assembly 43. The feedback transducer 185 is preferably housed in its own enclosure 187 which may be coupled to the cabinet 71 as shown in the dotted outline of FIGS. 3 and 4. Coupling of the transducer 185 to the actuator rod member 45 is by a rigid arm 189 affixed to the rod member 45 near its front clevis 53 and adapted to receive one end of a flexible, nylon covered steel cable 191. The length of the arm 189 is preferably selected such that the longitudinal axis of the cable 191 is parallel to that of the rod member 45.

Figure 8:
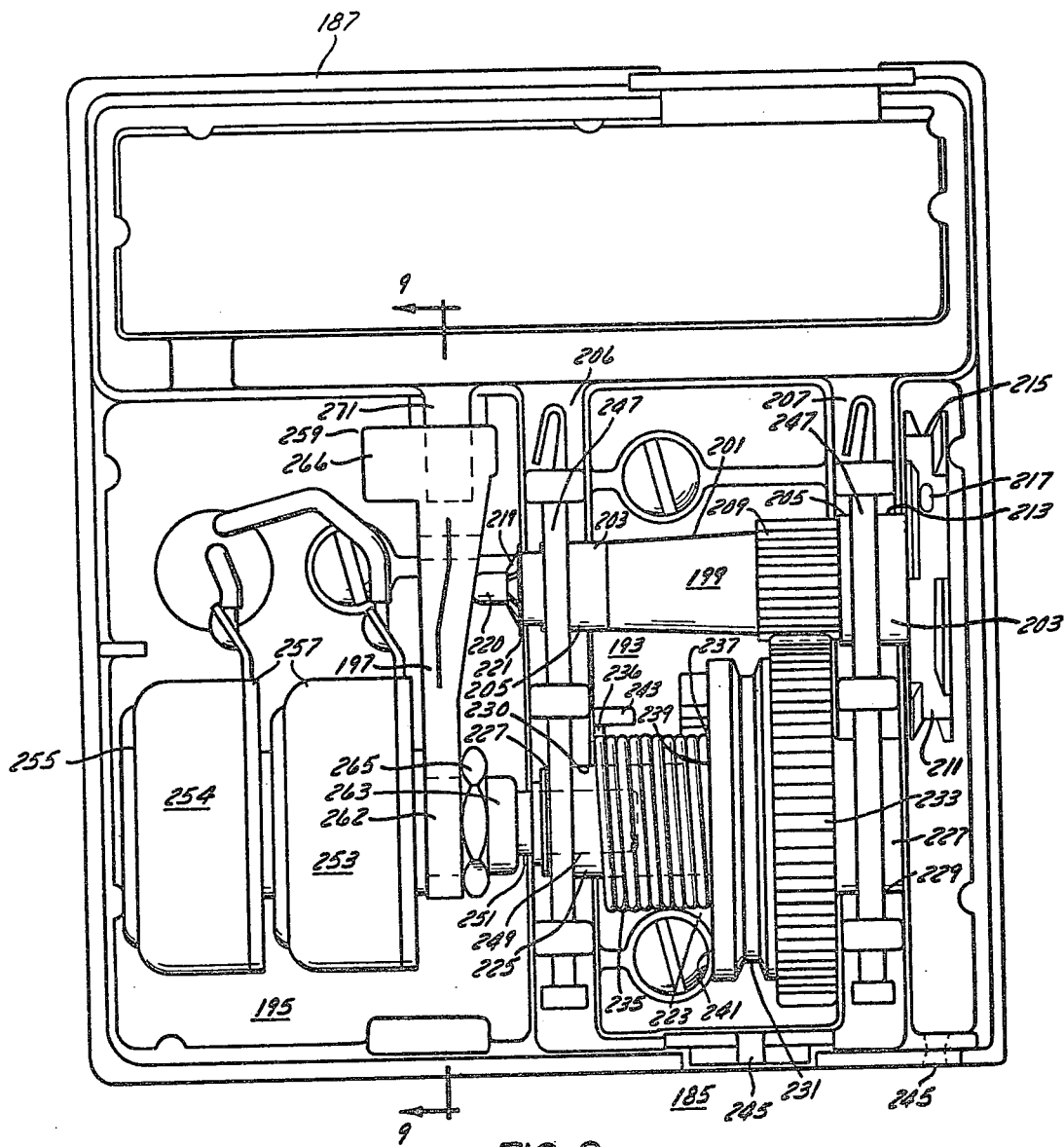
FIG. 8 is a top plan view of the positioner feedback transducer.
Figure 9:
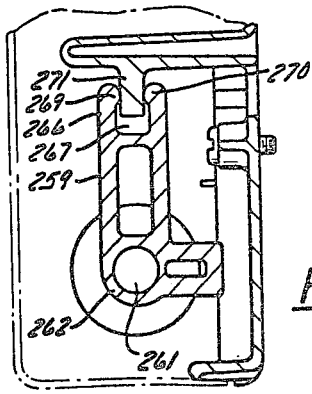
FIG. 9 is a side elevation view, partly in cross section, of the transducer alignment mechanism taken along section line 9—9 of FiG. 8.

Referring to FIGS. 8 and 9, the feedback transducer 185 is shown to include a drive mechanism 193 adapted to be cable connected to actuators of different maximum spans, a position-indicating signal generating mechanism 195 and an alignment mechanism 197 for isolating the signal generating mechanism 195 from otherwise damaging misalignment reaction forces or moments generated by the drive mechanism 193. In a preferred embodiment, the drive mechanism 193 includes a first pulley assembly 199 comprising a tapered, elongate shaft member 201 supported for rotation upon cylindrical end portions 203 by conformably shaped notches 205 formed in a first wall 206 and a second wall 207. A pinion gear 209 is formed on the shaft member 201 and is disposed intermediate the first wall 206 and the second wall 207 adjacent the latter. A first pulley 211 is affixed to a first end 213 of the shaft member 201 and has a grooved periphery 215 for receiving and guiding the cable 191. An aperture 217 is formed along the periphery 215 for receiving a steel retaining ball (not shown) crimped to the cable end. The ball is retained in engagement with the edge of the aperture 217 by overlaying several wraps of cable 191 thereupon. The shaft 201 is restrained from longitudinal movement by the pulley 211 and by a pushnut 219 disposed upon an appropriate stud 220 at the second end 221.

A second pulley assembly 223 is operatively coupled to the first assembly 199 and includes an elongate, slightly tapered second shaft member 225 having its centerline disposed parallel to that of the first shaft member 201 and having cylindrical end portions 227 supported for rotation by a conformably shaped notch 229 in the second wall 207 and by a generally shape conforming but slightly oversized notch 230 formed in the first wall 206. A second grooved pulley 231 is affixed to the second shaft member 225 for receiving and guiding the cable 191 and similarly includes an aperture (not shown) for receiving the steel retaining ball. A main gear 233 is disposed upon the shaft member 225 intermediate the second pulley 231 and the second wall 207 in geared engagement with the pinion gear 209 while a coiled torsion spring 235 is concentrically disposed upon the second shaft member 225 with a slight clearance therebetween and has a first end 237 received in a pocket formed in the pulley face 239 and defined at its perimeter by an outwardly extending flange lip 241. The torsion spring 235 includes a tang 236 protruding at either end along an axis normal to the longitudinal centerline of member 225 and tangent to the spring periphery, the first of which is received in a notch (not shown) formed in the flange lip 241 of the second pulley and the second of which engages a protruding lip 243 formed in the transducer enclosure 187 adjacent the first wall 206. Openings 245, are provided in the transducer enclosure 187 for permitting the cable 191 to pass therethrough with clearance. When the pulley assemblies 199, 223 are constructed and arranged in this manner and when the torsion spring 235 is wound to a suitable preload, backlash between the pinion gear 209 and the main gear 233 is prevented and provision is made for the rewinding of the cable 191 as the actuator rod member 45 is retracted. Retaining straps 247 are affixed to the first wall 206 and the second wall 207 for positionably confining the first shaft 201 and the second shaft 225 while permitting free rotation thereof. The leftward end portion 227 of the second shaft 225 has a pocket 249 formed to a depth therein for receiving the snugly fitted first, knurled end portion 251 of the signal generating mechanism 195. The second pulley assembly 223 is thereby adapted for driving interior rotatable elements of the mechanism 195 comprising a first potentiometer 253 and a second potentiometer 254. The outboard end 255 of the second potentiometer 254 is unsupported, for reasons set forth in greater detail below.

In order to permit rotation of the interior rotating elements of the potentiometers 253, 254 over an arc of approximately 200 degrees, restrain from rotation the potentiometer second portions 257 defined by the exterior housings and yet isolate the signal generating means 195 from potentially damaging misalignment forces or moments, the feedback transducer 185 incorporates a unique alignment mechanism 197 shown in FIGS. 8 and 9 to include a generally L-shaped arm member 259 having a circular opening 261 formed at the apex 262 thereof for closely fitted engagement with a stud 263 protruding from and affixed to the second portions 257 of the potentiometers 253, 254. The apex 262 is securely clamped to the stud 263 by a threaded locknut 265 provided for the purpose. The outer end 266 of the arm member 259 has an elongate cavity 267 formed therein to define an enlarged upper lip 269 and an enlarged lower lip 270 having spacing therebetween sized for engaging with slight clearance a tongue 271 protruding from the enclosure 187. Arrangement in this manner will permit slight translating and rotating movement between the lips 269, 270 and the tongue 271, thereby permitting the mechanism 195 to be continuously self aligned with the second shaft member 225. That is, a first axis defined by the concentric longitudinal centerlines of the first portion 251 and the second shaft member 225 may thereby be permitted a limited amount of movement, both translational and rotational, with respect to a reference axis which is coincident with the first axis when the transducer 185 is in a generally relaxed state. The pulley assemblies 199, 223 and arm 259 are preferably formed of a molded acetal, homopolymer thermoplastic material such as that sold under the trademark Delrin 500, the straps 247 preferably formed of a molded thermoplastic material such as nylon 6/12 and the torsion spring 235 preferably formed of stainless steel. The indicated thermoplastic compositions are preferably selected in view of their wearing characteristics when interfaced one with the other and in view of the fact that the acetal composition Delrin 500 is acceptably stable dimensionally in the presence of moisture.

While a signal generating mechanism 195 comprising two potentiometers 253, 254 has been shown and described, it should be understood that only the first potentiometer 253 is necessary for proper operation of the feedback transducer 185 when used in a positioner 10 of either the second embodiment or the third embodiment. However, if it is desired to operate a positioner 10 of the third embodiment in a slave relationship to one of the second embodiment, the second potentiometer 254 is utilized for generating a position-indicating signal used in such an arrangement as described in greater detail below.

From the foregoing description, it will be appreciated and understood that the feedback transducer 185 converts the linear motion of the piston assembly 43 and the steel cable 191 coupled thereto to a rotary motion of interior portions of each potentiometer 253, 254 for providing linear, in-phase changes of potentiometer resistance which are representative of the position of the piston assembly 43. While a satisfactory transducer may be constructed utilizing only one pulley with or without associated gearing or by using two pulleys of disparate diameter upon a common shaft, a preferred transducer 185 as shown and described may be adapted for use with actuators 29 having a total span or travel which is equal to or less than one of two predetermined maximum dimensions. That is, by coupling one end of the steel cable 191 to the first pulley 211, a total cable and piston assembly stroke length may be accommodated wherein the stroke length is some multiple of that which will result when the cable 191 is affixed to the second pulley 231. Reasonable cost and maximum adaptability to field conditions will thereby result. Persons of ordinary skill in the art will appreciate that this multiple is a function of pulley diameter and gear ratio and in a preferred embodiment, the pulleys 211, 231 are of identical diameter and the gear ratio is approximately 3.25:1 for accommodating actuator spans of nominally six and one half inches or two inches maximum.

Figure 10:
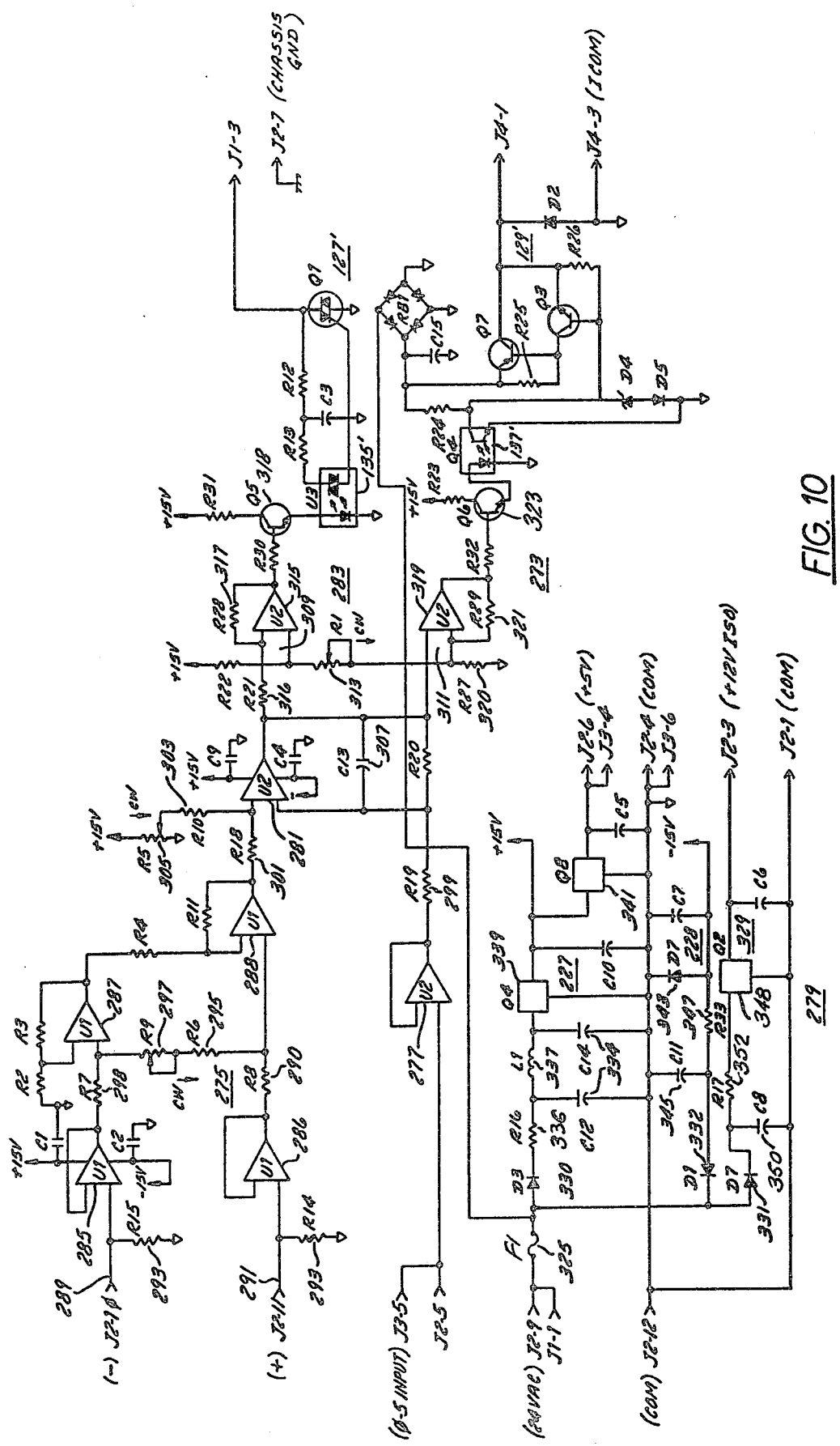
FIG. 10 is a schematic circuit diagram of the positioner proportional electronic control panel.

Referring to FIGS. 1, 7 and 10, the electronic positioner 10 of the third embodiment differs only slightly from that of the second and includes, in addition to the air compressor 59, the normally open solenoid valve 61, the feedback transducer 185 and the optional pressure switch 63, an analog proportional control panel 273 in place of the incremental proportional control panel 67. Particular details of the proportional electronic control panel 273 are shown in FIG. 10 to include a differential input amplifier 275, a feedback buffer amplifier 277, a quad power supply 279, a summing amplifier 281, a dual comparator 283, a first circuit 127' for driving the compressor 59 and a second circuit 129' for driving the solenoid valve 61. A comparison of the first circuit 127' and the second circuit 129' will show that those portions of the proportional electronic control panel 273 are identical to the first circuit 127 and the second circuit 129 of the incremental electronic control panel 67. The panel 273 receives command signals from the controller 31, sums those signals with a feedback signal indicative of the actual position of the piston assembly 43, compares the sum to a standard reference and, depending upon the error therebetween, provides output signals of 24 VAC and/or 12 VDC to energize the air compressor 59 and the coil of the solenoid valve 61, as required.

The differential input amplifier 275 is provided for the reduction of electrical noise and includes four operational amplifiers 285, 286, 287, 288, amplifiers 285, 286 being unity gain non-inverting voltage followers for providing a high input impedance to the first and second incoming control signal lines, 289 and 291, respectively. Resistors 293 are provided for referencing each signal line 289, 291 to ground. The difference between the voltages emanating from the two voltage follower amplifiers 285, 286 is attenuated in a ratio determined by the sums of resistors 295 and 297 as a numerator and of resistors 297, 298, 295 and 290 as a denominator. Adjustment of the value of resistor 297 will accommodate a range of control signal spans of approximately 1.7 VDC to 8 VDC. This attenuated control signal is then directed to a third operational amplifier 287 and a fourth operational amplifier 288 for amplification by a factor of six. The third operational amplifier 287 is arranged in a non-inverting mode and partially amplifies a portion of the differential control signal while the fourth amplifier 288 completes the amplification by amplifying the attenuated control signal differential. Construction and arrangement of the differential input amplifier 275 as shown and described is preferred in order to provide a maximum control signal range while avoiding saturation of any of the operational amplifiers 285–288. A feedback buffer amplifier 277 is configured as a non-inverting voltage follower for providing a high input impedance to the first potentiometer 253.

The summing amplifier 281, a unity gain type, subtracts the feedback signal generated by the buffer amplifier 277 and directed through the resistor 299 from the sum of the control signal directed through the resistor 301 additive to the offset voltage resulting from the resistor 303 in series with adjustable resistor 305. The control offset start point voltage is adjustable between the preferred 0-10 VDC by adjusting the value of the resistor 305. A capacitor 307 is provided for filtering unwanted noise from the feedback signal of the potentiometer 253.

The output of the summing amplifier 281 is directed to a dual comparator 283 including a first comparator 309 and a second capacitor 311 each of which compares the output sum of the summing amplifier 281 to a variable reference which is set nominally at one half the +15 VDC output of the power supply. An adjustable resistor 313 permits adjustment about this midpoint to provide a deadband of up to approximately 2% of the full stroke of an actuator 29. The first comparator 309 comprised of first amplifier 315 and resistors 316, 317 will be driven to saturation if the sum exceeds the reference voltage. In that event, the first transistor 317 is switched to a conducting state, the optically coupled triac 135' is switched to a conducting state and the compressor 59 is energized. If, on the other hand, this sum is less than the reference voltage, the second comparator 311 comprised of second amplifier 319 and resistors 320 and 321 will be saturated. In this event, the second transistor 323 is switched to a conducting state and the optical transistor 137' is thereby switched to a conducting state to de-energize the coil of the solenoid valve 61 to effect valve closure.

The power supply 279 is constructed and arranged to provide +15, −15, +12 and +5 VDC utilizing a 24 VAC input limited by a fuse 325 to a current of 2 amperes maximum. The +15 VDC and −15 VDC supplies 227, 228 respectively, are used to drive the amplifiers 275, 277, 281 and the dual comparator 283 while the +12 VDC supply 329 is used to drive the second potentiometer 254 (FIG. 8) when a positioner 10 of the third embodiment is slaved to a positioner 10 of the second embodiment. The +5 VDC signal is used as an input to the first potentiometer 253 for generating a feedback signal. The +15, +12 and −15 VDC voltages are obtained by halfwave rectification of the incoming 24 VAC signal using the diodes 330, 331 and 332 respectively. A pair of capacitors 334 are combined with a resistor 336 and inductor 337 for filtering the unregulated direct current voltage and directing it to the +15 VDC linear voltage regulator 339 while the +5 VDC linear voltage regulator 341 derives its input signal from the output side of the regulator 339. Because of the lowered power requirement, the −15 VDC supply 228 may be regulated by a zener diode 343 using a capacitor 345 and a resistor 347 as a filter. The +12 VDC voltage is derived using a regulator 348 having a capacitor 350 and a resistor 352 employed therewith for filtering.

In operation, a positioner 10 of the first embodiment is coupled to an actuator 29 to be controlled and a suitable pneumatic conductor 69 is coupled therebetween. A separate source 349 of 24 VAC power, a computerized controller 31 and a system ground connection 351 are attached to appropriate terminals of the electronic panel 67. Depending upon the existence and polarity of the digital signals emanating from the controller 31, the control panel 67 may receive a +12 VDC digital signal, a −12 VDC signal or no signal therefrom. Assuming that the actuator piston assembly 43 is at or near its bottom position, i.e., with its biasing spring 49 fully extended, and further assuming the reception of a +12 VDC digital signal from the controller 31, the air compressor 59 will be energized together with the coil of the solenoid valve 61 for effecting valve closure. Compressed gas will thereby be directed to the chamber 51 of the actuator 29, causing its piston assembly 43 to move outwardly. If the digital signal is the result of the solution of an algorithm adapted for incremental control, such movement will be equal to a percentage of the total available span as commanded by the controller 31, whereupon the control signal will cease. During those times when no control signal is being received therefrom, the compressor 59 will be de-energized and the coil of the solenoid valve 61 will remain energized to maintain valve closure and, consequently, piston assembly position. Upon reception of a −12 VDC signal from the controller 31, the compressor 59 will remain de-energized and the solenoid valve 61 will become de-energized to permit compressed gas to be controllably expelled from the actuator chamber 51 under the force of the biasing spring 49. Continuous positioning control of the actuator piston assembly 43 may thereby be effected.

When using a positioner 10 of the second embodiment, the feedback transducer 185 is incorporated therewith by mounting as described above, by attachment of the arm 189 to the rod member 45, by the installation of the end of a cable 191 upon either the first pulley 211 or the second pulley 231 and by the attachment of the other cable end to the arm 189. If the positioner 10 of the second embodiment is used alone, only the first potentiometer 253 is used to provide a position feedback signal. If a positioner 10 of the third embodiment is coupled in slave relationship to one of the second embodiment, the second feedback potentiometer 254 is utilized and the resulting feedback voltage signal therefrom is used as the control input voltage to the control panel 273 of the positioner 10 of the third embodiment. As with the positioner 10 of the first embodiment, that of the second embodiment is adapted to receive +12 V., −12 V. or 0 V. digital DC signals from the controller 31.

When using the positioner 10 of the third embodiment, a feedback transducer 185 is arranged therewith as described above. The control panel 273 is adapted to receive analog proportional signals from the controller 31, such signals preferably being in the range of 0–18 VDC to represent 0–100% of stroke of the actuator 29. When used in a slave relationship to a positioner 10 of the second embodiment, a portion of the power supply 279 provides +12 VDC for excitation of the second potentiometer 254 on the positioner 10 of the second embodiment and the resulting feedback voltage signal is used as the control input for the positioner 10 of the third embodiment.

The following component types and values have been found useful in the preferred embodiments. Resistance (R) is in ohms; capacitance (C) is in microfarads; inductance (L) is in millihenries.

| FIG. 6 | | | |
|---|---|---|---|
| R1 | 2.7K | R4 | 470 |
| R2 | 180 | R5 | 7.5K |
| R3 | 100 | R6 | 1K |
| C1 | 0.47 | C2 | 100 |
| D1, D2, D3, D5 | 1N4448 | Q1 | 2N6069A |
| D4 | 1N4742 | Q2 | TIP30A |
| U1 | MOC3010 | Q3 | TIP29A |
| U2 | MCT2 | RB1 | WO2M |
| FIG. 10 | | | |
| R1 | 200 | R21, R22, R27 | 2K |
| R2, R10, R11, R14 | 100K | R23, R25, R26, R31, R33 | 1K |
| R15, R18, R19, R20 | 100K | R24 | 7.5K |
| R3, R4 | 20K | R28, R29 | 6.8M |
| R5 | 5K | R30, R32 | 2K |
| R6 | 66.5 | C1, C2, C4, C9 | 0.01 |
| R7, R8, R9 | 10K | C3, C5, C6, C7, C10 | 0.47 |
| R12 | 2.7K | C8, C11, C12, C14, C15 | 100 |
| R13 | 180 | C13 | 10 |
| R16 | 22 | | |
| R17 | 1.5K | | |

Resistors R2-R4, R6, R7, R8, R10, R11, R14, R15, R18-22, R27 are preferably of the metal film, 1% tolerance type while others are preferably of the carbon film type.

| Q1 | 2N6069A | Q5, Q6 | 2N3643 |
|---|---|---|---|
| Q2 | LM140LAH-12 | Q7 | TIP30A |
| Q3 | TIP29A | Q8 | LM140LAH-5 |
| Q4 | LM140LAH-15 | | |
| D1, D3, D7 | 1N4004 | D4 | 1N4742 |
| D2, D5 | 1N4448 | D6 | 1N4744 |
| L1 | 2.2 | U3 | MOC3010 |
| U1, U2 | LM124J | U4 | MCT2 |

While only a few embodiments of the inventive positioner have been shown and described, it is not intended to be limited thereby but only by the scope of the appended claims.

We claim:

1. A transducer for generating a feedback signal representative of the position of a linearly-movable member including:

a signal generating mechanism for providing an electrical feedback signal representative of the position of a linearly-movable member, said signal generating mechanism including a first shaft portion having a first longitudinal centerline;

a drive mechanism including a shaft member coupled in driving engagement to said first shaft portion, said drive mechanism being adapted to be cable connected to one of a plurality of linearly-movable members having maximum travel spans different one from the other, said shaft member including a shaft longitudinal centerline concentric with said first centerline, said centerlines thereby defining a first axis;

an alignment mechanism coupled intermediate said drive mechanism and said signal generating mechanism and adapted to permit limited movement of said first axis with respect to a reference axis, said alignment mechanism thereby isolating said signal generating mechanism from misalignment reaction forces.

2. The invention set forth in claim 1 wherein said signal generating mechanism includes a potentiometer having a housing;

said alignment mechanism includes an arm member adapted to engage a tongue for permitting relative motion therebetween;

said arm member and said tongue cooperating for preventing rotation of said housing about its longitudinal axis during rotation of said first shaft portion.

3. The invention set forth in claim 2 wherein said tongue is maintained stationary and said arm member is coupled to said housing for slight coincident movement therewith.

4. A feedback transducer for generating a signal representative of the position of a movable member, said transducer including:

a drive mechanism having a first, rotatable pulley assembly, said first assembly including a first gear and a first pulley coupled to a first shaft member;

said drive mechanism further including a second pulley assembly coupled to said first assembly, said second assembly including a second pulley attached thereto, each of said pulleys being adapted to be drivingly coupled to said movable member;

a potentiometer coupled to said drive mechanism for providing an electrical feedback signal representative of the position of said movable member;

an alignment mechanism having an arm member coupled to a housing of said potentiometer for preventing substantial rotational movement of said housing about its longitudinal axis while yet permitting translational movement of said housing, said alignment mechanism thereby isolating said potentiometer from misalignment reaction forces.

5. The invention set forth in claim 4 wherein said second pulley assembly includes a second shaft, the rotational axes of said first shaft and said second shaft being in generally parallel, spaced-apart relationship one to the other.

6. The invention set forth in claim 5 wherein said coupling of said second pulley assembly to said first pulley assembly is by a second gear in driven engagement with said first gear.

7. The invention set forth in claim 4 wherein said first gear and said second gear define a gear ratio other than 1:1.

8. The invention set forth in claim 7 wherein said pulleys are adapted to be coupled to said movable member by a flexible cable and said drive mechanism further includes spring means for retracting said cable to a predetermined reference position.

9. A transducer for generating a feedback signal representative of the position of a pneumatic cylinder, said transducer including:

a potentiometer having an external housing and an interior rotating element coupled to a first shaft portion for generating a feedback signal representative of the position of said cylinder;

a drive mechanism including a second pulley assembly drivingly coupled to said first shaft portion and a first pulley assembly drivingly coupled to said second pulley assembly, said first pulley assembly including a rotatable first shaft having a pinion gear and a first pulley concentrically attached thereto;

said second pulley assembly including a main gear and a second pulley concentrically attached thereto, said main gear being in driven engagement with said pinion gear;

an alignment mechanism including an arm member disposed intermediate said second shaft and said potentiometer housing, said arm member including an apex coupled to said housing and an outer end adapted to engage a tongue, said outer end and said tongue cooperating for preventing substantial rotation of said housing about its longitudinal axis while yet permitting slight translational movement of said housing, thereby isolating said potentiometer from misalignment reaction forces.

10. The invention set forth in claim 9, wherein said transducer includes a plurality of potentiometers and said main gear and said pinion gear define a gear ratio of about 3:1.

* * * * *

UNITED STATES PATENT AND TRADEMARK OFFICE
CERTIFICATE OF CORRECTION

PATENT NO.　：　4,476,415
DATED　　　：　October 9, 1984
INVENTOR(S)：　Thomas O. Kautz

It is certified that error appears in the above–identified patent and that said Letters Patent are hereby corrected as shown below:

Remove Gerald A. Duenkel as a named inventor

Column 4, Line 15, "o" should be --of--

Column 10, Line 46, "capacitor" should be --comparator--

Column 10, Line 55, "317" should be --318--

Column 14, Line 13 Claim "4" should be Claim --6--

Signed and Sealed this

Eleventh Day of June 1985

[SEAL]

Attest:

DONALD J. QUIGG

Attesting Officer　　Acting Commissioner of Patents and Trademarks